United States Patent [19]
Wölfges

[11] Patent Number: 5,979,862
[45] Date of Patent: Nov. 9, 1999

[54] PILOT-OPERATED PROPORTIONAL PRESSURE LIMITING VALVE

[75] Inventor: Hans Wölfges, Lohr/Main, Germany

[73] Assignee: Mannesman Rexroth AG, Lohr/Main, Germany

[21] Appl. No.: 08/875,426

[22] PCT Filed: Dec. 23, 1995

[86] PCT No.: PCT/EP95/05124

§ 371 Date: Jul. 3, 1997

§ 102(e) Date: Jul. 3, 1997

[87] PCT Pub. No.: WO96/22481

PCT Pub. Date: Jul. 25, 1996

[30] Foreign Application Priority Data

Jan. 20, 1995 [DE] Germany .......................... 195 01 683

[51] Int. Cl.⁶ .................................................. F16K 17/10
[52] U.S. Cl. ................................. 251/30.01; 251/30.03; 137/596.16
[58] Field of Search ............................... 251/30.01, 30.02, 251/30.03, 44; 137/596.16, 596.17, 487.5, 625.64

[56] References Cited

U.S. PATENT DOCUMENTS 5,328,147  7/1994  Stobbs ............................... 251/30.03 X

FOREIGN PATENT DOCUMENTS 2362325  3/1978  France .
3619044  12/1986  Germany .
3824089  11/1989  Germany .

OTHER PUBLICATIONS

Der Hydraulik Trainer, vol. 2, published by Mannesmann Rexroth GmbH, Lohr/Main, Germany, pp. B20 and B21, Jan. 1986.

*Primary Examiner*—Kevin Lee
*Attorney, Agent, or Firm*—Martin A. Farber

[57] ABSTRACT

A pilot-operated proportional pressure limiting valve with a pilot valve, with a main piston which can be acted on in closing direction by pressure prevailing in a control chamber and in opening direction by pressure prevailing in an inlet, with a control oil nozzle device between the inlet and the pilot valve and with a damping nozzle device between the control chamber and the pilot valve, wherein the total hydraulic resistance of the damping nozzle device is variable as a function of the stroke of the main piston. The damping nozzle device comprise a radial hole in the main piston, and in the closed position of the main piston the radial hole debouches towards the outside in the region of a radially narrow annular slot and, after a given stroke of the main piston, in the region of a radially wide annular slot.

1 Claim, 5 Drawing Sheets

PILOT-OPERATED PROPORTIONAL PRESSURE LIMITING VALVE

FIELD AND BACKGROUND OF THE INVENTION

The present invention relates to a pilot-operated proportional pressure limiting valve. The invention also relates to a method of operating a pressure limiting valve.

Pilot-operated proportional pressure limiting valves are known. One known proportional pressure limiting valve is described in the book "Der Hydraulik Trainer", Vol. 2, published by Mannesmann Rexroth GmbH, Lohr/Main, pages B20 and B21.

From DE 38 24 089 A1 a pilot-operated proportional pressure limiting valve having a control oil nozzle arranged in a main piston is known. In order to obtain a very small adjustable pressure, the outlet of a control oil nozzle for the feeding of control oil to a pilot-operated valve is brought directly out of the main piston by connecting means.

The proportional pressure limiting valve in accordance with DE 38 24 089 A1 tends under certain circumstances to vibrate in the region of small volumetric flows and high pressure. Therefore, a damping nozzle is already provided in the main piston in the valve according to DE 38 24 089 A1. Since, however, within the above-indicated range, the control stroke of the main piston is very small and thus the volume of control oil displaced via the damping nozzle from the control space is also very small, the damping action of the damping nozzle on the control stroke of the main piston is too weak and the valve cannot be prevented from vibrating within this region.

SUMMARY OF THE INVENTION

The object of the present invention is, therefore, to avoid the disadvantages of the prior art, in particular also in the region of small volumetric flows and high pressure, to obtain an excellent damping of the main piston in order, in particular, to prevent the valve from vibrating.

BRIEF DESCRIPTION OF THE DRAWINGS

With the above and other objects and advantages in view, the present invention will become more clearly understood in connection with the detailed description of preferred embodiments, when considered with the accompanying drawings of which.

DETAILED DESCRIPTION OF THE PREFERRED EMBODIMENT

Figure 5:
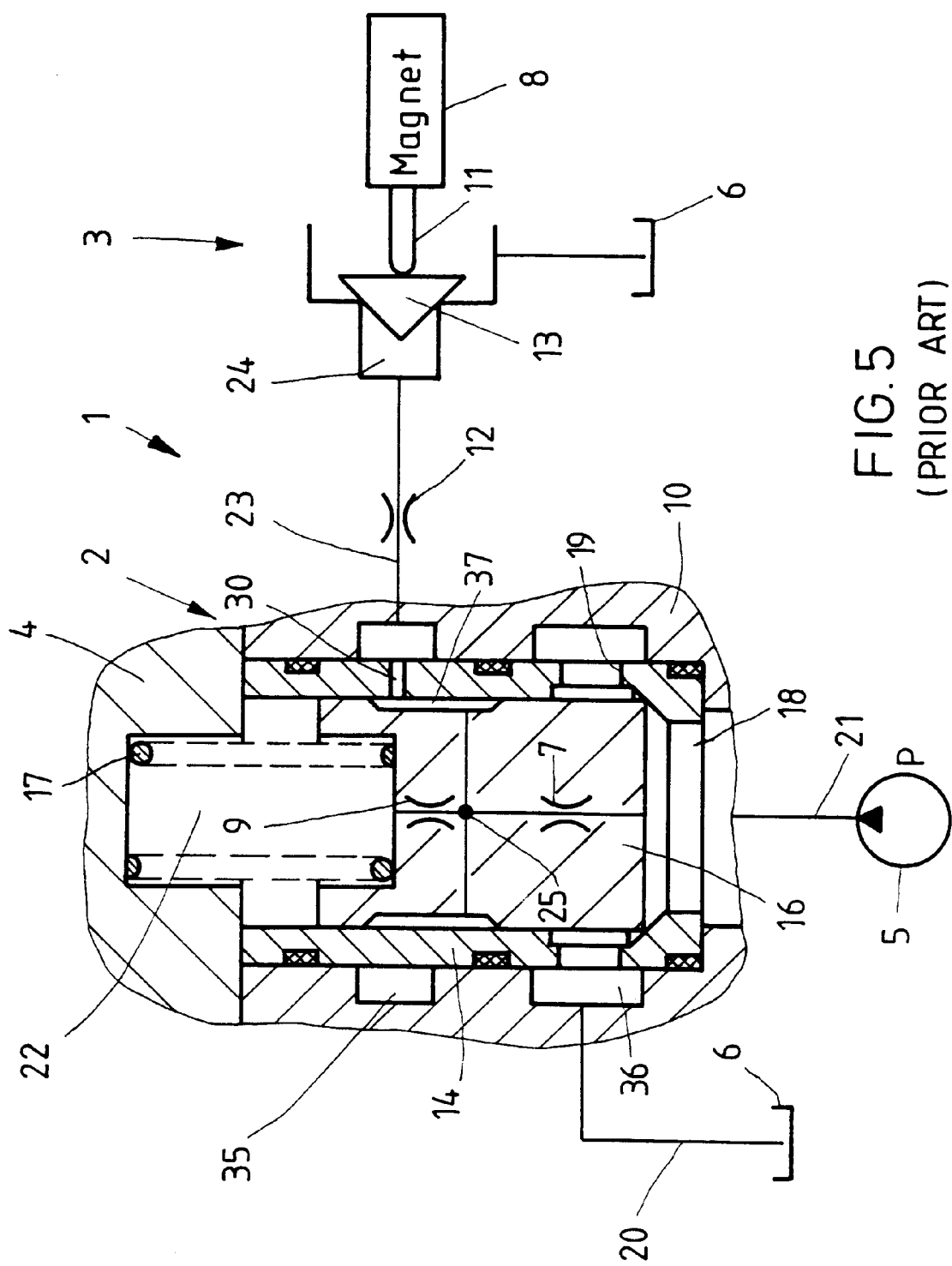
FIG. 5 diagrammatically shows a pilot-operated proportional pressure limiting valve in accordance with the prior art.

The valve 1 of FIG. 5 consists of a main valve 2 and a pilot valve 3. A pump is designated 5 and a tank 6. The pilot valve 3 has a proportional magnet 8 which can act via a magnetic ram 11 on a pilot cone 13.

The main valve 2 has a bushing 14 inserted into a recess in a housing 12 closed by a cover 4, a main piston 16 which is urged by a closure spring 17 against its seat being arranged in said bushing. Within the bushing 14 there is an axially extending inlet hole 18 as well as several radially extending outlet holes 19. The pump 5 is in communication via a line 21 with the inlet hole 18, while the outlet holes 19 are in communication with the tank 6 via a line 20. The pressure in the inlet hole 16 urges the main piston 16 in opening direction.

In order to produce a precontrol or pilot pressure, the inlet hole 18 is connected via a control oil nozzle 7 and a damping nozzle 9 to the spring or control chamber 22. A pressure in the control chamber 22 urges the main piston 16 in closing direction. The point of connection 25 of the two nozzles 7 and 9 is connected, via another nozzle 12 which also has the function of a damping nozzle, with a pressure chamber 24 of the pilot valve 3. The damping nozzle 12 is arranged in a line 23 which connects the pressure chamber 24 of the pilot valve 3, via a radial channel 30 present in the bushing 14 and a first annular channel 37 arranged on the outer circumference of the main piston 16, through the connecting point 25.

A second annular channel 25 is arranged on the outer circumference of the bushing 14 in the housing 10 and is connected, via the radial channel 30, with the first annular channel 37. The outlet holes 9 open towards a third annular channel 36 which is also arranged on the outer circumference of the bushing 14 within the housing 10 and is in communication via the line 20 with the tank 6. If the pressure in the pump line 21, and thus in the inlet hole 18, rises to the value set on the pilot valve 3, the valve then opens. Due to the control nozzle 7, a pressure gradient is produced on the main piston 16. The piston lifts off from its seat and opens the connection from the pump 5 via the outlet holes 19 to the tank 6.

The invention will be explained below with reference to FIGS. 1 to 4. In said figures, the same reference numerals designate the same or similar parts in FIG. 5. The pilot-operated proportional pressure limiting valves 101, 102, 103 and 104 in accordance with the invention which are shown in FIGS. 1 to 4 are formed, like the valve 1 shown in FIG. 5, of a main valve 201, 202, 203 and 204 and a pilot valve 3. The pilot valve 3 in the embodiments of FIGS. 1 to 4 is developed similar to the pilot valve of the known pressure limiting valve 1 shown in FIG. 5. For a description of the pilot valve 3, reference is had to this extent to the description of FIG. 5.

Figure 1:
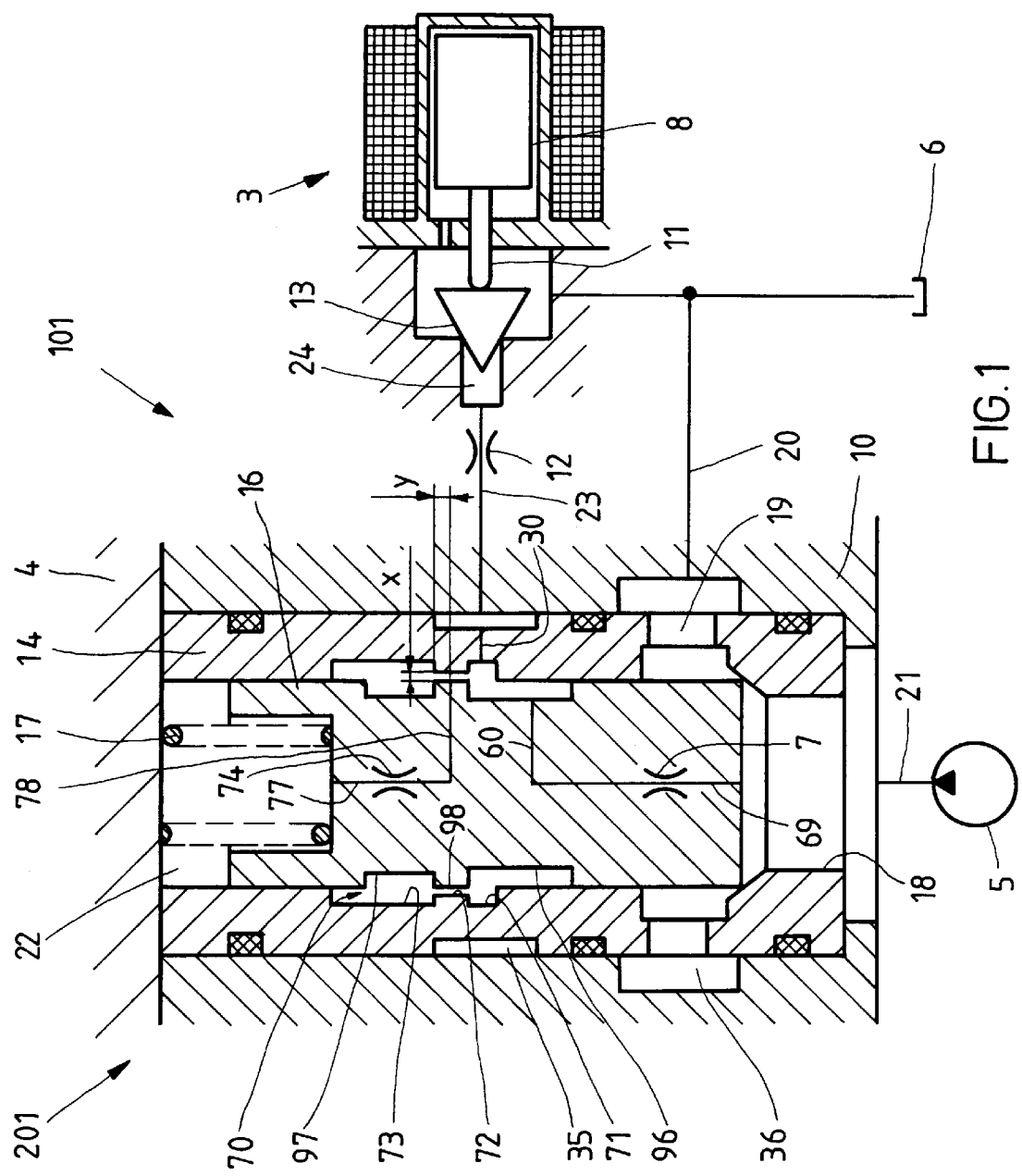
FIG. 1 diagrammatically shows a longitudinal section through a pilot-operated proportional pressure limiting valve according to a first embodiment of the present invention.

FIG. 1 shows a first pilot-operated proportional pressure limiting valve 101 in accordance with the invention. The main valve 201 has a bushing 14 in which there is a main piston 16. This main piston is urged against its seat by a closure spring 17 present in the control chamber 22. If the main piston 16 has lifted off from its seat then pressure fluid can flow via the outlet holes 19 from the pump 5 via the pipeline 21 into the annular channel 36 which is in communication with the tank 6 via the line 20.

Between the inner circumference of the bushing 14 and the outer circumference of the main piston, an annular channel 20 is arranged in the bushing 14. In the cross-sectional view of FIG. 1 it can be noted that the annular channel 70 has three sections 71, 72 and 73 which follow one behind the other along the longitudinal axis of the main valve. The individual channel sections 71, 72, and 73 are limited by rectangular edges. The annular channel section 71 is connected via a radial channel 30 with the annular channel 35 formed on the outer circumference of the bushing 14 within the housing 10 and with the pilot valve 3 via the conduit 23 and the nozzle 12. In the middle annular channel section 72, the inside diameter of the bushing 14 is substantially less than in the annular channel sections 71 and 73, but still slightly larger than the diameter of the main piston 16. The main piston 16 has two rectangular indents 96 and 97 which are also rectangular in cross section and are separated from each other by a web 98.

The axial width of the web 98 is equal to the axial width of the annular channel section 72 on the bushing 14. The indent 96 which is on the same side of the web 98 as the annular channel section 71 with respect to the middle annular channel section 72 is substantially longer than the annular channel section 71, while the indent 97 is shorter than the annular channel section 73. In the closed position of the main piston 16, the annular channel section 72 and the bushing 14 and the web 98 of the main piston 16 are precisely opposite each other radially. Between them, there is then a narrow free space the radial width of which is determined by the annular channel section 72. In FIG. 1, the radial width of the free space is designated x.

In the main piston 16 a control oil nozzle 7 is furthermore provided in an axially extending blind hole 69 which is open towards the inlet hole 18. The blind hole 69 extends along the center axis of the main piston 16 and continues in a radial hole 60 which debouches radially outward into the indent 96. Furthermore, in the main piston 16 there is a damping nozzle 74 which is arranged in a channel which is formed of an axial hole 77 which is open towards the control chamber 22 and of a radial hole 78 which debouches outward in the web 98. The axial hole 77 extends along the center axis of the main piston 16.

The object of the damping nozzle is to dampen the control stroke of the main piston 16 in order to prevent the valve 101 from vibrating. The damping nozzle 74 acts as hydraulic resistance over the entire stroke of the main piston 16. Another hydraulic resistance is formed by the radial hole 78 and the section 72 of the annular channel 70. This hydraulic resistance is active only in the indicated stroke region y (small volumetric flow, high pressure) of the main piston 16. With a larger stroke of the main piston 16 the radial hole 78 comes out of the region of the annular channel section and opens towards the annular channel section 73 of the bushing 14. In the stroke region y, therefore, a combination of two hydraulic resistances arranged one behind the other, namely the nozzle 74 and the hydraulic resistance formed by the radial hole 78 and the annular channel section 72 and operating in accordance with the impact-plate principle, acts as effective damping nozzle. The effective throttle cross section which is dependent on the piston stroke is now smaller in the stroke region y and thus the total hydraulic resistance is greater than the throttle cross section of the nozzle 74, and thus its individual hydraulic resistance. This results in a stabilizing of the valve 101 in the region of small volumetric flows with high pressure. Due to the fact that the hydraulic resistance formed by the radial hole 78 and the annular channel section 72 is not effective over the entire piston stroke, impermissibly high pressure peaks or pressure reductions are avoided upon large changes in volumetric flow, which improves the dynamica of the valve. Of course, the cross section of the holes 77 and 78 also influences the damping of the main piston 16.

Figure 2:
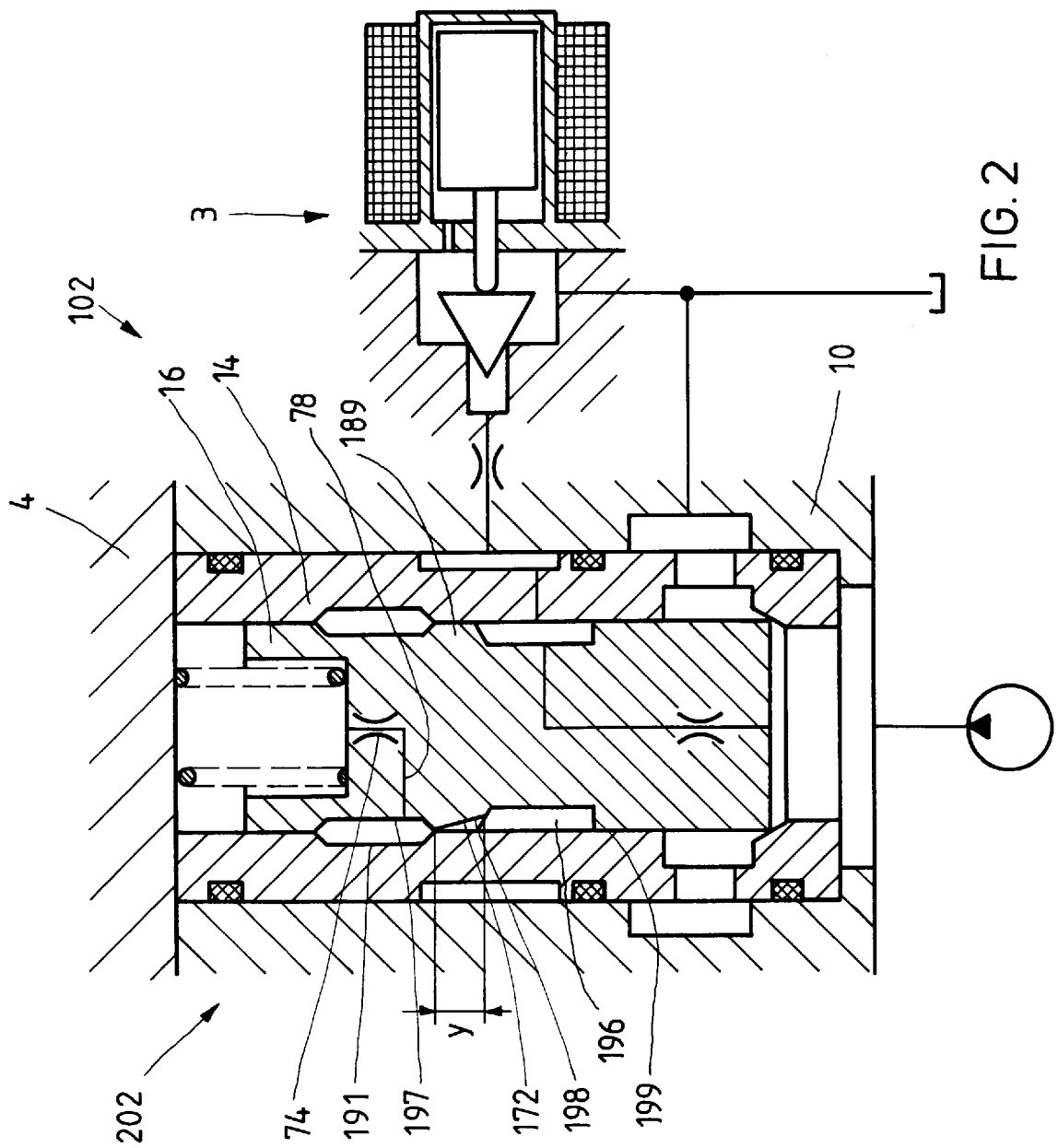
FIG. 2 diagrammatically shows a longitudinal section through a pilot-operated proportional pressure limiting valve according to a second embodiment of the present invention.

A second embodiment of main valve 202 of a proportional pressure limiting valve 102 in accordance with the invention will now be described in connection with FIG. 2. On the inner circumference of the bushing 14 there is a trapezoidally shaped, annular depression 191. On the outer circumference of the main piston 16 there is a first annular indent 196 with a vertical edge 199 and a second trapezoidal indent 197. In a web 189 between the indents 196 and 197 there is a wedge-shaped section 198, as can be noted in the cross-sectional view. In contrast to the embodiment explained in FIG. 1, the radial hole 78 debouches into an indent on the main piston 16, namely into the second indent 197, which, in the closed position of the main piston 16, lies precisely opposite the depression 191 in the bushing 14. The channel 172 formed between the wedge-shaped indent 198 and the inner wall of the bushing 14 forms with the damping nozzle 74, similar to the embodiment shown in FIG. 1, two damping nozzles arranged one behind the other. The wedge-shaped indent 198 which, as shown in the drawing, need not be arranged completely annularly around the main piston 16 is active only in the stroke of the main piston 16 designated y in the drawing. Upon a larger stroke of the main piston 16, only the throttle cross section of the nozzle 74 is active. As already explained in connection with FIG. 1, a stabilizing of the valve is thereby obtained since the effective damping action is improved in the region of small volumetric flows with high pressure without the dynamics of the valve upon large changes in volumetric flow being impaired thereby.

A third embodiment of a main valve 203 of a proportional pressure limiting valve in accordance with the invention will now be described with reference to FIG. 3. Similar to the embodiment shown in FIG. 2, an annular depression 291 having this time a rectangular cross section is developed on the inner circumference of the bushing 14. The depression 291 is connected by a radial hole 292 to an annular groove 296 on the outer circumference of the bushing 14, into which hole the line 23 debouches. On the outer circumference of the main piston 16 there is now formed an annular indent 297 of rectangular cross-sectional profile. The damping nozzle 74 is now developed as a channel extending radially through the main piston 16 between the spring space 22 and the inner wall of the bushing 14. In the closed position of the main piston 16, shown in FIG. 3, which corresponds to the position shown in FIGS. 1 and 2, the nozzle is not active. Another channel 200, the throttle cross section of which is smaller than that of the nozzle 74, also extends radially through the main piston 16 and, in the closed position and with small stroke of the main piston 16, connects the spring space 22 with the depression 291. Over the stroke region of the main piston 16 designated y, therefore only the channel 200 is active as damping nozzle. If the control stroke of the main piston 16 is greater, then the channel 200 is no longer in communication with the depression 291, but the damping nozzle 74 connects the spring space 22 with the depression 291. Therefore, with small stroke of the main piston 16 the small throttle cross section of the damping nozzle 200 is active in order to avoid vibrations. With a larger stroke of the main piston 16 the damping nozzle 74 of larger throttle cross section prevents an impairment of the dynamics of the valve 1.

Figure 3:
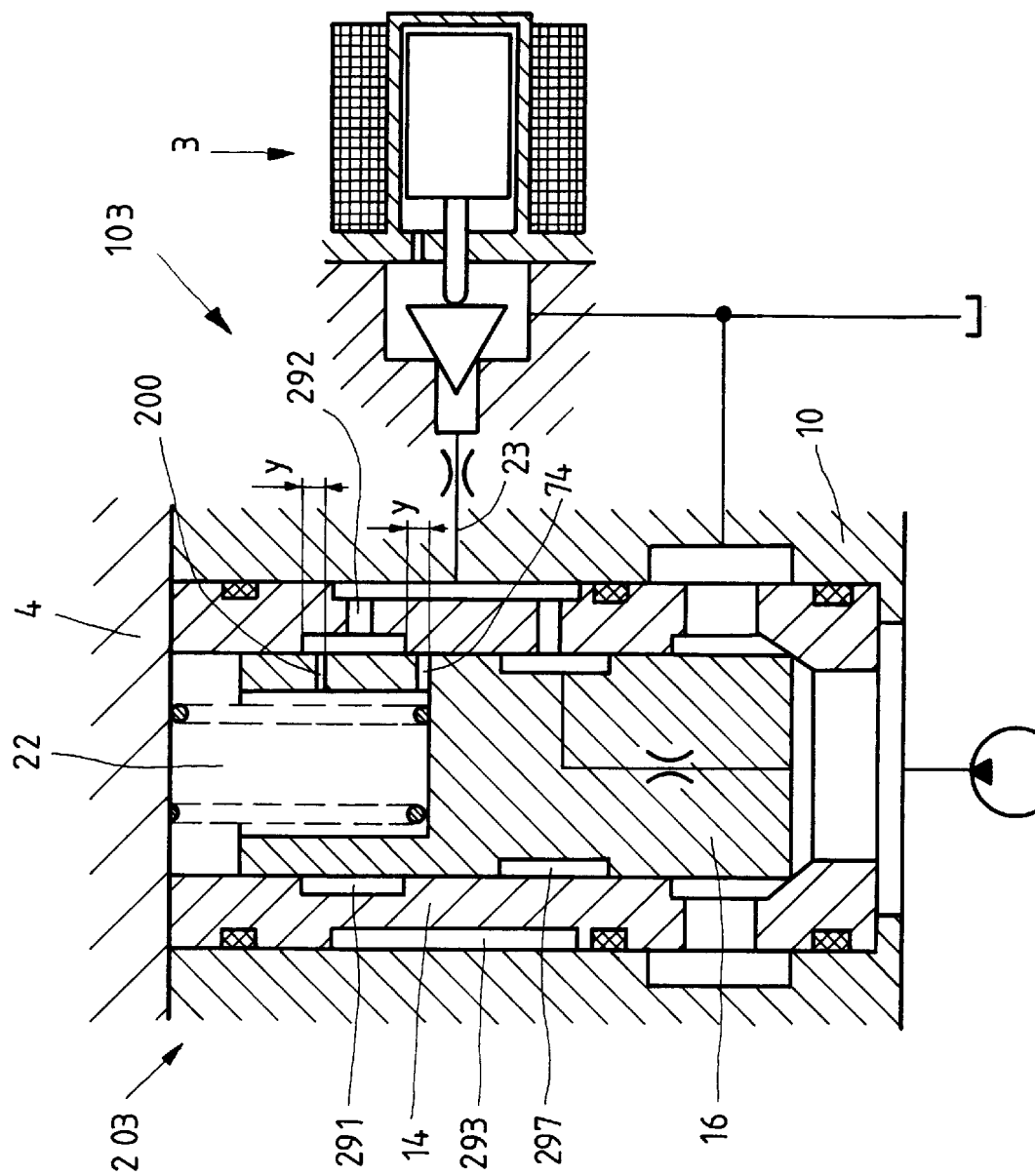
FIG. 3 diagrammatically shows a longitudinal section through a pilot-operated proportional pressure limiting valve according to a third embodiment of the present invention.

In FIG. 3 the channel 200 and the damping nozzle 74 are developed in parallel and the two damping devices or channels can be used alternatively, depending on the control stroke of the main piston 16. This is indicated by the control stroke y shown twice in FIG. 3, in the case of which the channel 200 is active.

Figure 4:
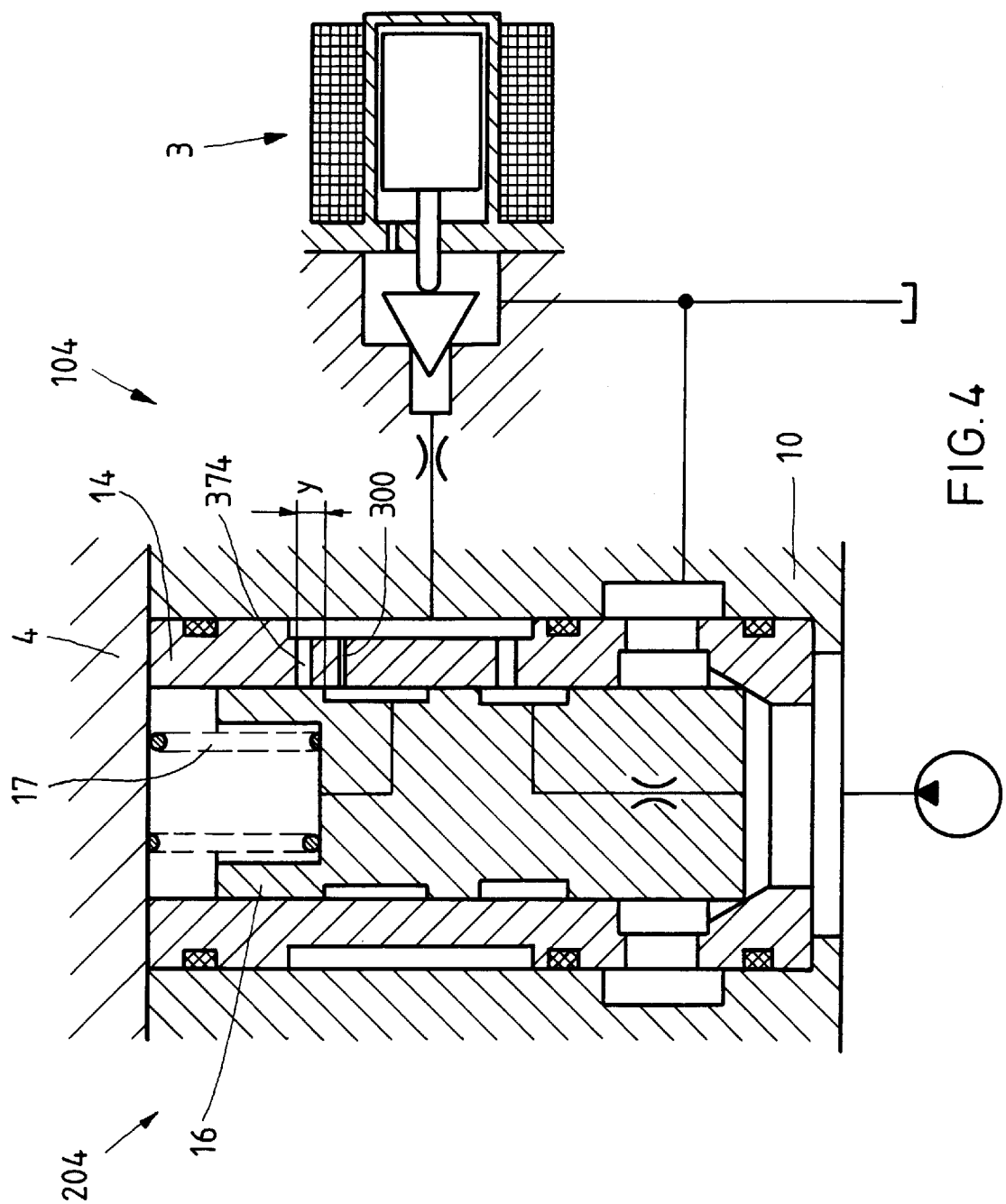
FIG. 4 diagrammatically shows a longitudinal section through a pilot-operated proportional pressure limiting valve according to a fourth embodiment of the present invention.

In accordance with a fourth embodiment of a main valve 204 of a proportional pressure limiting valve 104 in accordance with the invention which is shown in FIG. 4, a channel 374 and a channel 300 are now also arranged in parallel. In contradistinction to the embodiment shown in FIG. 3, the channel 374 and the channel 300 are both developed as a radial channel in the bushing 14. In the closed position of the main piston shown in FIG. 4 and with a small stroke of the main piston 16, only the channel 300 is active. The combined throttle cross section (sum of the throttle cross sections) of the channel 374 and the channel 300 corresponds to the throttle cross section of the nozzle 74 in the embodiments of FIGS. 1 to 3. If the stroke of the main piston 16 now increases beyond the amount indicated by y, then the joint throttle cross section of the channel 300 and the channel 374 is active. In the case of the position shown in FIG. 4, in which the spring 17 urges the main piston against its seat, to be sure only the channel 300 is active as damping device and the advantages indicated above are obtained due to the smaller throttle cross section than upon the use of both damping devices 374, 300.

I claim:

1. A pilot-operated proportional pressure limiting valve with a pilot valve, with a main piston which can be acted on in closing direction by a pressure prevailing in a control chamber and in opening direction by a pressure prevailing in an inlet, with control oil nozzle meens between the inlet and the pilot valve and with damping nozzle means between the control chamber and the pilot valve, wherein the total hydraulic resistance of the damping nozzle means is variable as a function of the stroke of the main piston, wherein the damping nozzle means comprise a radial hole in the main piston, and in the closed position of the main piston said radial hole debouches towards the outside in the region of a radially narrow annular slot and, after a given stroke of the main piston, in the region of a radially wide annular slot.

* * * * *